C. B. BRANSON.
TROLLEY STABILIZER.
APPLICATION FILED SEPT. 13, 1921.
1,408,860.
Patented Mar. 7, 1922.
3 SHEETS—SHEET 2.
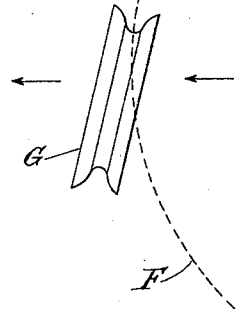
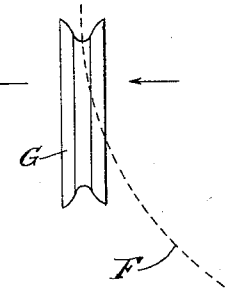
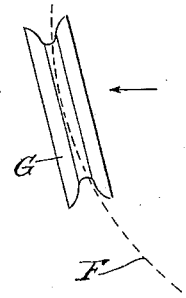
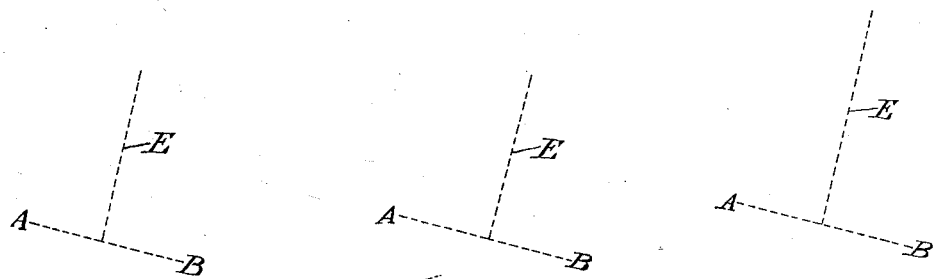
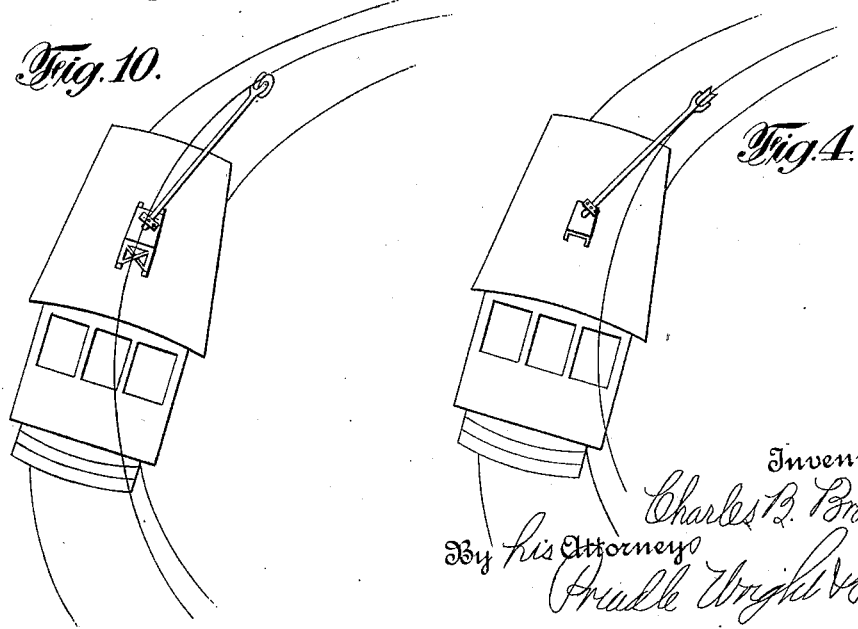
Inventor
Charles B. Branson.
By his Attorneys C. B. BRANSON.
TROLLEY STABILIZER.
APPLICATION FILED SEPT. 13, 1921.
1,408,860.
Patented Mar. 7, 1922.
3 SHEETS—SHEET 3.
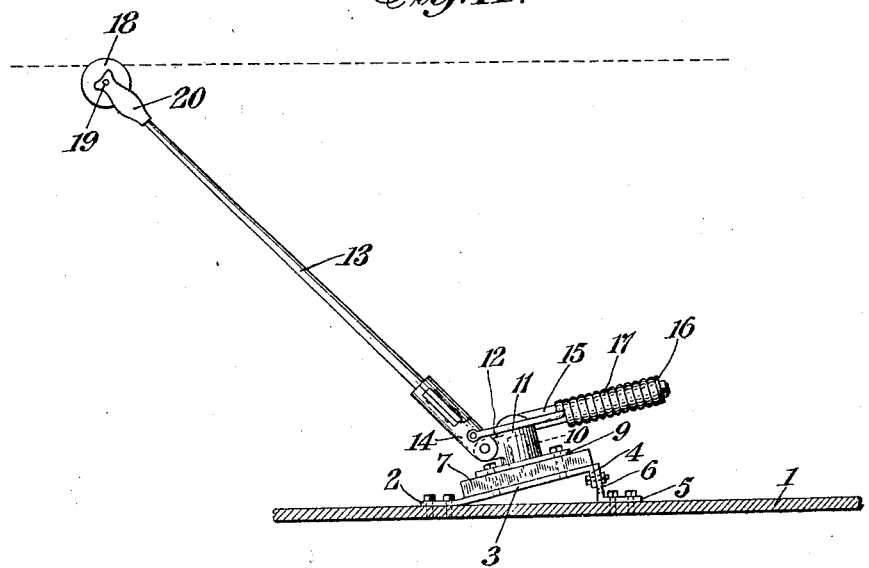
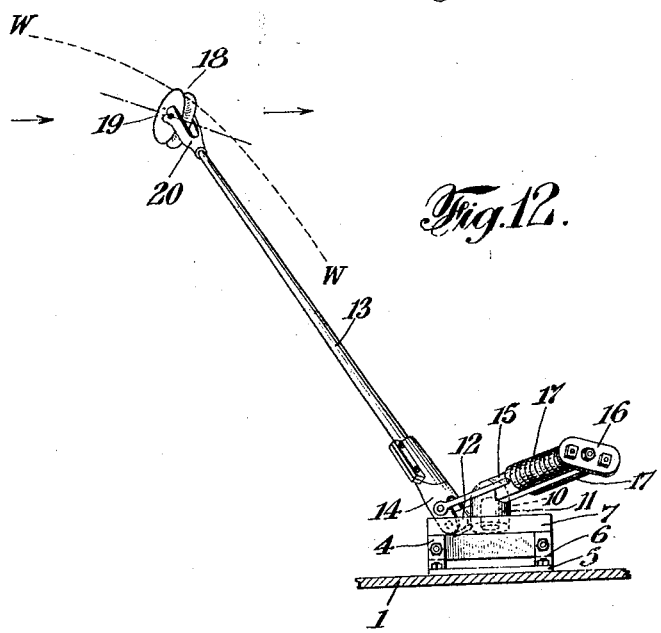
Inventor
Charles B. Branson,
By his Attorneys
Prindle, Wright & Small.

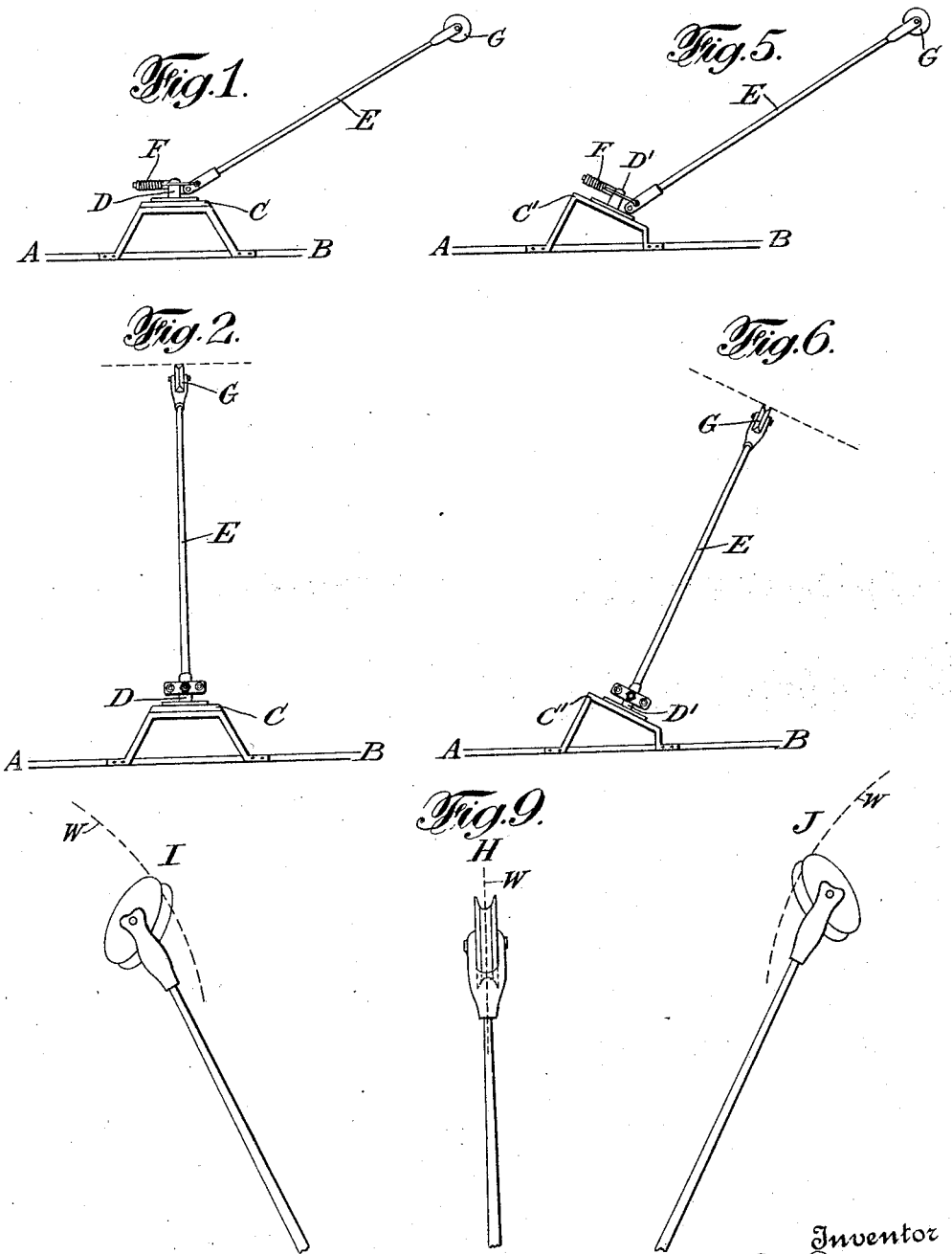

UNITED STATES PATENT OFFICE.

CHARLES B. BRANSON, OF LINCOLN, NEBRASKA.

TROLLEY STABILIZER.

1,408,860.  Specification of Letters Patent.  Patented Mar. 7, 1922.

Application filed September 13, 1921. Serial No. 500,401.

*To all whom it may concern:*

Be it known that I, CHARLES B. BRANSON, a citizen of the United States, a resident of Lincoln, in the county of Lancaster and State of Nebraska, have invented a certain new and useful Trolley Stabilizer, of which the following is a specification.

My invention relates to overhead trolleys including the pole and wheel and the mounting therefor upon the roof of the car to receive the current from the usual overhead wire.

An important object of the invention is the prevention of the contacting device such as the trolley wheel or the contact shoe, if the latter is used instead of a wheel, of an electrically propelled car from escaping from the overhead conducting or trolley wire at switches, turns, curves and other deviations from the straight-line path, places where most of the difficulties of this nature now occur.

Another object of this invention is to provide a more exact and continuous centering of the groove of the trolley wheel or the shoe on the overhead wire, and hence a smoother and more uniform "tracking" of the same upon the wire and with less friction between the parts.

These and other objects of my invention will more fully appear from the detailed statement of the principles thereof and the detailed description of illustrative embodiments thereof hereinafter to be given; but it is to be understood that the specific embodiments described are merely illustrative of my invention and the invention is not to be limited thereto but may be embodied in many different forms.

In the accompanying drawings forming a part of this specification, Figs. 1 to 10 inclusive, are partially diagrammatic views illustrating the principles of my invention; and Fig. 11 is a side elevational view and Fig. 12 a front perspective view of a desirable practical working embodiment of my invention.

My invention contemplates the utilization to the overhead trolley wheel or the contact shoe, if the latter is used instead of a wheel, of the principle utilized in stabilizing the car wheels upon the track below in rounding a curve, namely a leaning of the wheel against the track upon which it runs and inwardly of the curve described by the track to resist the centrifugal force tending to throw the wheel from the track and outwardly of the curve described thereby.

As is well known, this stabilizing effect of the car wheels upon the track below is produced by elevating the outer rail above the level of the inner rail of the curve, as illustrated in Figs. 4 and 10. My invention contemplates a simple and effective means of producing this stabilizing effect of the trolley upon the overhead wire, corresponding to the track below, causing the trolley wheel or the shoe to lean against the trolley wire in a manner that will brace the contacting device against those forces which tend to throw it outwardly, thereby reproducing the results above that are now achieved by track elevation below for stabilizing the car wheels upon the track.

My invention is applicable to any contacting device mounted upon a pole or other framework upon the car and subject to lateral deviations relative to the car and overhead wire; but as its principles of operation are best illustrated by the ordinary trolley wheel mounted upon a pole, particular reference will be made to such a mechanism. To clearly present the principles of my invention, and its mode of operation, therefore, a brief preliminary consideration of the present customary practice in the art regarding the relationship between the car body, the trolley pole, the trolley wheel and conductor, is deemed desirable. This relationship is shown in the partially diagrammatic views of Figs. 1, 2, 3, and 4.

In Fig. 1, the line AB diagrammatically represents the top of the car with A toward the front and B toward the rear in the direction assumed by the car in travel. Mounted upon this top is an elevated base C having a flat top, parallel with the car roof, supporting a swivel D to which the trolley pole E is pivoted for swinging movement in a vertical plane, the entire mounting being such, therefore, that the pole may partake of an up and down swinging movement in a vertical plane because of its pivotal connection to the swivel D, and a lateral bodily swinging movement to the right or the left because of the swivel D upon the base C. F is the jack spring tending to swing the pole upwardly and G the trolley wheel maintained by the spring in pressing engagement against the trolley wire.

As the trolley base is in a plane parallel with the car roof as shown in Fig. 1 (assuming for our present consideration that the car roof is in a single plane parallel with the plane of the tracks considered as extending across the upper surfaces of the rails), when the pole swings laterally by rotation of the swivel D, the various parts attached to the pole, including the axis of the trolley wheel, swing in planes always parallel to the car roof. Fig. 2 illustrates this, showing the pole swung around ninety degrees from its position in Fig. 1, and at right angles to the longitudinal axis of the car, with the axis of the trolley wheel still in a plane parallel to the roof of the car.

Upon a straight track and with the two rails thereof at the same level, this mounting of the trolley presents the flanges of the trolley wheel at the same level and hence equally overlapping a straight trolley wire. When the car is negotiating a curve however, as illustrated in Fig. 4, the outer elevated rail of the track inclines the car body inwardly of the curve and correspondingly inclines the roof of the car. As the mounting referred to maintains the axis of the trolley wheel parallel with the plane of the car roof in all positions of lateral deflection of the trolley pole, the axis of the trolley wheel is similarly inwardly inclined, thus elevating the outer and lowering the inner flange of that wheel, as shown in Fig. 4 and diagrammatically on a larger scale in Fig. 3. In the latter figure, the dotted line AB represents the inclination of the plane of the car track, the dotted line E the inclination of the car body, the dotted line F the trolley wire, while the trolley wheel G is shown in full lines, with the flange on the outer side of the curve of the trolley wire shown at a substantially greater elevation than the inner flange.

It will be seen from a consideration of Figs. 3 and 4, that while the track elevation lends stability to the car wheels and the car body in negotiating a curve, it tends to unstabilize the trolley wheel by reason of the following: The momentum of the centrifugal force acting on the pole and trolley wheel tends to swing them outwardly, and also any dragging friction in the swivel mounting resists the lateral inward deflection of the trolley pole necessary to keep the wheel upon the wire, both of these being recognized causes of detachment of the wheel from the wire. All of these forces act in the direction of the arrows in Fig. 3, and even when not sufficient to disengage the wheel from the wire if the inner flange were at its normal level in engagement with the wire, are sufficient to overcome the comparatively slight holding effect of the lowered inner flange upon the wire and to force the wheel outwardly therefrom.

It is the object of my invention to overcome the defects in the present practice of the art thus pointed out, and by means, the principles of which have hereinbefore been stated in general terms, and which will be more fully explained with reference to the partially diagrammatic views of Figs. 5, 6, 7, 8, 9 and 10 before proceeding to the detailed description of a working embodiment of my invention, illustrated in Figs. 11 and 12.

As hereinbefore stated, my invention contemplates means causing the trolley wheel to lean against the trolley wire, when the car is negotiating a curve, in a manner that will brace the wheel against the wire to resist those forces which tend to throw it outwardly of the wire. To this end, the trolley wheel, the pole, and the trolley mounting are so cooperatively arranged that when the car in cooperation with the overhead wire engaging the trolley wheel, in negotiating a curve, deflects the trolley pole from its normal position in the median longitudinal vertical plane of the car, a tipping effect is given to the axis of the trolley wheel in a direction to incline that axis on a line upwardly toward the inside of the curve of the overhead wire and thus cause the wheel to lean against the wire in a direction to retain the same thereon.

One manner of accomplishing this is illustrated in Figs. 5 and 6. These views show a base C' of the elevated type as shown in Figs. 1 and 2 but with the top thereof, bearing the swivel D' to which the trolley pole E is pivoted, inclined rearwardly of the car roof AB. By such a mounting, the lateral swing of the trolley pole is about an inclined axis which inclines the axis of the trolley wheel G out of parallelism with the plane of the roof of the car, the axis of the trolley wheel being parallel with the plane of the roof of the car only in the position of the trolley pole E shown in Fig. 5, that is, with the trolley pole in the median longitudinal vertical plane of the car without deviation therefrom to the right or the left. The inclination of the axis of the trolley wheel out of parallelism with the plane of the roof of the car when the trolley pole is swung laterally in the rotation of the swivel D' is clearly illustrated in Fig. 6, which presents by contrast to Fig. 2, the principles of operation involved.

With an inclined base upon the roof of the car, as shown in Fig. 10, upon negotiating a curve, the wheel-bearing end of the trolley pole is deflected laterally and inwardly of the curve precisely as in the old practice illustrated in Fig. 4. But by the swing of the pole upon an axis rearwardly inclined to the roof of the car, the axis of the swivel D' (Figs. 5 and 6), is such as to incline the axis of the trolley wheel in a direction upwardly and inwardly of the curve described by the trolley wire, as shown in Fig. 10 and opposite to the lateral inclination of the plane of the car roof and hence also opposite to the inclination of the axis of the trolley wheel in the old practice illustrated in Fig. 4.

The extent of this inclination of the axis of the trolley wheel depends upon the pitch of the curve of the track and for a given pitch thereof, depends upon the pitch of inclination of the base upon which the trolley pole is swiveled. For a known degree of curvature of track and angle of inclination of the track upon the curve, a degree of inclination of the trolley base can be predetermined which will, when the trolley pole is laterally deflected while the car is negotiating the curve, cause just those relative opposite inclinations of the car roof and axis of the trolley wheel which will present the opposite flanges of the trolley wheel at the same level on opposite sides of the trolley wire, as diagrammatically illustrated in Fig. 7. A trolley base of greater inclination will then cause a greater inclination of the axis of the trolley wheel in a direction opposite to the inclination of the plane of the roof of the car, as shown in Fig. 8, to present the inner flange of the trolley wheel at a higher level than the outer flange and in a position to engage the inner side of the trolley wire to resist those forces heretofore referred to operating in the direction of the arrows in Fig. 8, and to prevent the trolley wheel from being thrown outwardly from the wire.

The principles of operation hereinbefore referred to are utilized not only to retain the trolley wheel upon the wire when the car is negotiating curves but to secure a better centering of the wheel upon the wire with the wire contacting the bottom of the groove of the wheel and hence a more uniform "tracking" of the trolley wheel on the wire than has heretofore been possible due in part to the leaning of the trolley wheel bodily against the curve in the wire in the manner hereinbefore stated, and in part to the positive action of the jack spring upon the trolley wheel in its various positions relative to the wire.

To illustrate these principles, Fig. 9 shows three positions of the trolley wheel and pole, an intermediate position H in which the flanges of the trolley wheel extend the same distance on opposite sides of the wire W, measured from the plane of the track or the plane of the roof of the car. This is the normal position occupied by the pole and wheel in the straight line travel of the car and in which position the pole, wheel and wire are all in the perpendicular median longitudinal plane of the car. The position I in Fig. 9 represents a right hand curve or deviation of the wire relative to the track (viewed in the direction of travel of the car) and the pole is shown so laterally deflected and turned upon its own axis as to present the trolley wheel inclined upwardly to the left (viewed in the direction of travel of the car) so as to present the flange on the inside of the curve at the higher level. The position J shows a left hand curve and with the trolley pole so deflected and partially rotated as to present the wheel inclined upwardly to the right and presenting the flange on the inside of the curve at the higher level. A right hand deviation in the wire relative to the track is therefore responded to by a leaning of the trolley wheel to the left, and vice versa, so that it may be said that a balancing action of the trolley wheel upon the wire takes place, stabilizing the wheel thereon.

It is further to be observed that, aside from the retaining effect of the elevated flange of the trolley wheel against the wire upon the inside of a curve, this inclination of the wheel upon curves presents the flanged part of the wheel in a better position for centering the wheel upon the wire than is attained when the wheel is not thus inclined. This is apparent from a comparison of Figs. 3, 7 and 8. Fig. 3 represents the old practice in which the axis of the trolley wheel is always parallel to the transverse plane of the track or transverse plane of the roof of the car (assuming the plane of the roof of the car parallel with that of the track), represented by the line AB. In this figure, the trolley wheel is so inclined as to dispose the major portion of its grooved surface outwardly of the curve of the wire so that the wire is necessarily in engagement almost entirely with the inner flange and with but a slight engagement upon the bottom of the groove between the flanges. Fig. 7 represents the position of the trolley wheel relative to the wire attained by a deflection of the trolley pole upon an axis inclined to the roof of the car sufficient only to present the flanges of the wheel at the same level upon the wire. Here the more nearly centered position of the wire in the groove of the wheel is clearly apparent. Fig. 8 represents the position of the wheel substantially inclined against the wire and showing a substantially complete centering of the wire in the groove of the wheel. The last mentioned relative positions of the wire and wheel, it is obvious, greatly minimize friction between the parts as well as contribute to smooth and uniform tracking. The trolley wheel in traveling over a curved portion of the wire to a straight portion gradually assumes the vertical position shown at H in Fig. 9 which is obviously the position for proper "tracking" of the wheel upon a straight line portion of the wire.

It is particularly to be observed, moreover, that the trolley wheel in all its various positions relative to the overhead wire, does not merely follow the wire nor is the operative principle involved solely an alteration of the inclination of the wheel by pressure of the wire thereon so as to provide an automatic accommodation of the wheel to curves, abrupt turns or sudden deflections in the wire; but the wheel, because of the tension of the jack spring transmitted thereto, positively reacts upon the wire, and the balancing of the wheel upon the wire referred to is a positive action of the wheel relative to the wire. Moreover, the positive pressure exerted by the spring independently of the wire, not only tends to maintain the wheel in its various inclined positions relative to the wire but tends to center the wheel upon the wire with the wire at the bottom of the groove between the wheel flanges without requiring either flange to receive the brunt of the laterally exerted forces hereinbefore referred to, and hence provides for a uniform "tracking" and lessened friction between the parts.

A preferred working embodiment of my invention is illustrated in Figs. 11 and 12.

The numeral 1 denotes the roof of the car. In this embodiment the trolley base is adjustable in the degree of its inclination relative to the car roof, changes in this inclination, as already stated, affecting the degree of inclination of the axis of the trolley wheel relative to the plane of the car roof when the trolley pole is laterally deflected and hence the degree of inclination of the trolley wheel relative to the overhead wire upon curves or other deviations from the straight line. The capability of such adjustment adapts the device to a wide range of uses, among which are its use upon different roads in different communities where the customary curves of the tracks of one road are of substantially different degrees of curvature from those of another road.

As shown in Figs. 11 and 12, the trolley base support is formed of a pair of strap-iron supports each having a rear flat terminal 2 with apertures therethrough for the passage of bolts or other holding means to be inserted through corresponding apertures in the car roof to attach the strap iron supports in place on the car roof, an extended intermediate portion 3 inclined at an angle to the rear terminals 2, and a front arc-shaped depending terminal 4 adapted to cooperate with the angle legs, one for each strap iron support. One limb 5 of each leg is flat and adapted to rest upon the car roof, as shown, and with apertures therein to register with corresponding apertures in the car roof for the insertion of bolts or other holding means, while the other limb 6 of each leg extends upwardly upon a slight curve corresponding to the curvature of the lug 4 and adapted to cooperate therewith. Apertures at different heights are formed in the limb 6, two being shown, while a single aperture is formed in the lug 4, the single aperture in the lug adapted to register with either of the apertures in the supporting leg depending upon the degree of inclination of the body portion 3 of the strap iron. The difference of inclination required is comparatively slight and the strap irons may be sufficiently bent to vary the angle between the terminal portion 2 and the body portions 3 to permit of the required adjustment. When the adjustment is made bolts or other fastening means are passed through the aperture in the lug 4 and that aperture in the limb 6 of the supporting leg with which the aperture in the lug 4 is brought into registry.

Across the space between the parallel disposed supporting straps and upon the upper surfaces of their inclined portions 3, is placed the usual wooden platform 7, or a platform of any desired material, with apertures therein registering with apertures in the strap irons for the insertion of bolts or other fastening means.

To the upper surface of the platform 7 is bolted a swivel of the customary, or any desired type, in the illustrative embodiment comprising a plate 9 fastened to the platform 7 and terminating in a centrally disposed upstanding swivel journal 10, forming the male member of the swivel, and cooperating with the recessed cap 11 forming the female member thereof.

The cap 11 has a lug 12 extending radially from one side thereof to which the lower end of the pole 13 is pivoted in the usual manner by ears 14 extending over the lug 12, as shown, for swinging movement in a vertical plane.

On the side diametrically opposite the lug 12, the cap 11 is provided with an arm 15 to the end of which is journaled the plate 16, between which plate and the pole 13 extends the jack springs 17, with their points of attachment to the pole adjacent to but above the pivot of the pole upon the lug 12 of the cap, and with the springs, therefore, exerting a constant force upon the pole 13 tending to elevate its end bearing the trolley wheel 18 into pressing engagement of the wheel with the overhead trolley wire.

The trolley wheel may be of the usual or any desired construction, having its axis 19 in a fork or trolley harp 20 attached to the end of the pole.

The parts are so arranged that in the position of the trolley pole and wheel in the median perpendicular longitudinal plane of the car, as represented in Fig. 11, and which is the position of the pole and wheel when the car is on a straight track and the overhead wire is properly aligned therewith, the axis 19 of the trolley wheel is in a plane parallel with the roof of the car and with both flanges of the wheel projecting on each side of the trolley wire at an equal height.

When the trolley wire, or that portion of it being traversed by the trolley wheel, is not in the median perpendicular longitudinal plane of the car, however, which divergence occurs, as stated, either when the car is negotiating a curve or when the car or trolley wheel is traversing portions of the track or overhead wire relatively diverging from the alignment referred to, a lateral deflection of the outer end of the pole occurs, made possible by the swivel mounting. Upon the rotation of the cap 11 in the swivelling movement, it is apparent that the lower end 14 of the pole attached to the lug 12 on the rotating cap, describes an arc in a plane parallel to the inclined base and that all other parts and attachments to the pole describe a like movement. The trolley wheel likewise partakes of this movement, which inclines its axis out of the plane parallel to the roof of the car.

The position thus attained is illustrated in Fig. 12, the straight broken line showing the inclination of the axis of the trolley wheel relative to the roof of the car, and the wheel as a whole being shown inclined and leaning against the trolley wire represented by the curved dotted line WW, the arrows indicating the direction of the centrifugal and other forces, heretofore referred to, tending to force the trolley wheel from the wire.

The turning of the pole upon its longitudinal axis by its revolution bodily upon the swivel 10—11 is also indicated by the relative positions assumed by the two jack springs 17, which in the normal undeflected position of the pole extend in a plane inclined to the length but not the width of the roof of the car as shown in Fig. 11, but which in the deflected position of the pole are in a plane transversely inclined to the roof of the car as shown in perspective in Fig. 12, which is a front view of the base with the pole laterally rotated.

It is to be observed that in the embodiment of the invention illustrated in Figs. 11 and 12, the springs 17 are connected to the sides of the pole 13 at points in planes parallel with the sides of the wheel 18, and the springs 17 are bodily supported between the pole 13 and the plate 16 freely journaled in the end of arm 15. The result is that the springs always exert a lifting effect in the direction of the inclination of the wheel 18. This is clear from a comparison of Figs. 11 and 12. In Fig. 11, the wheel occupies a position in a vertical plane and the springs 17 so extend in a transverse plane that their lifting effect upon the wheel is exerted through the pole 13 to the wheel in a direction in the vertical plane in which the wheel extends. In Fig. 12, the pole has been deflected to present the wheel inclined to the wire and the springs 17 have also been bodily moved into a position such that their lifting force upon the wheel is exerted in the direction of the inclination of the wheel. This action of the springs upon the wheel is of importance in the proper centering of the wheel upon the wire. As heretofore observed with reference to the diagrammatic Fig. 8, the inclined position of the wheel relative to the wire upon curves in the wire, presents the wheel in the best possible position for proper centering of the wire in the groove of the wheel. It is therefore of importance that the force tending to move the wheel toward the wire be exerted upon the wheel in the direction of the inclination thereof.

In the following claims, when the car roof or the plane of the car roof are referred to it is understood that the car roof is flat and its plane parallel with the plane of that portion of the track over which the car is positioned.

Having described my invention, what I claim and desire to secure by Letters Patent is:

1. In a structure adapted to support a trolley above the roof of a car, the combination with a trolley wheel adapted to engage an overhead wire, a member in which said wheel is journaled, resilient means tending to move said member to pressing engagement of said wheel with said wire, said member being mounted for movement of its wheel-bearing portion by opposite relative lateral deviations of said car and wire to present said wheel to said deviating portions of said wire in directions obliquely inclining the axis of said wheel to the plane of the roof of said car and toward the median perpendicular longitudinal plane of said car.

2. In a structure adapted to support a trolley above the roof of a car, the combination with a trolley wheel adapted to engage an overhead wire, a member in which said wheel is journaled, resilient means tending to move said member to pressing engagement of said wheel with said wire, said member being mounted for oscillation of its wheel bearing portion by opposite relative lateral deviations of said car and wire in directions obliquely inclining the axis of said wheel to the plane of the roof of the car and with the line of projection of said axis extending toward the roof of said car and intersecting the median perpendicular longitudinal plane of said car.

3. In a structure adapted to support a trolley above the roof of a car, the combination with a trolley wheel adapted to engage an overhead wire, a member in which said wheel is journaled, resilient means tending to move said member to pressing engagement of said wheel with said wire, said member being mounted for oscillation of its wheel bearing portion by opposite relative lateral deviations of said car and wire in arcs obliquely inclining the axis of said wheel to the plane of the roof of said car and with the downward direction of said axis extending toward the median perpendicular longitudinal plane of said car.

4. In a structure adapted to support a trolley above the roof of a car, the combination with a trolley wheel adapted to engage an overhead wire, a member in which said wheel is journaled, resilient means tending to move said member to pressing engagement of said wheel with said wire, said member being mounted for movement of its wheel bearing portion by opposite relative lateral deviations of said car and wire transversely of the roof of said car in directions to vary the angularity of the axis of said wheel relative to the plane of the roof of said car in proportion to the relative lateral deviations of said car and wire, with said axis inclined toward said car.

5. In a structure adapted to support a trolley above the roof of a car, the combination with a trolley wheel adapted to engage an overhead wire, a member in which said wheel is journaled, said member being rotatable about an axis inclined to the plane of the roof of said car, and resilient means tending to move said member to pressing engagement of said wheel with said wire.

6. In a structure adapted to support a trolley above the roof of a car, the combination with a trolley wheel adapted to engage an overhead wire, a member in which said wheel is journaled, said member being rotatable about an axis inclined to the plane of the roof of said car, and resilient means tending in all rotative positions of said member about said axis to move said member to pressing engagement of said wheel with said wire.

7. In a structure adapted to support a trolley above the roof of the car, the combination with a trolley wheel adapted to engage an overhead wire, a member in which said wheel is journaled, said member being rotatable about an axis transverse to the axis of said wheel and inclined to the plane of the car roof, and resilient means tending to move said member to pressing engagement of said wheel with said wire.

8. In a structure adapted to support a trolley above the roof of a car, the combination with a flanged trolley wheel, a supporting member therefor movably mounted relative to the roof of said car and normally positioned to present said wheel to that portion of the wire extending in the median longitudinal perpendicular plane of the car with the flanges of said wheel extending equal distances above said wire but adapted to be moved alternately in opposite directions from said normal position by opposite relative lateral deviations of said car and wire to present said wheel to said relatively deviating portions of said wire in inclined positions of said wheel against said wire to project that flange of said wheel on the side of said wire opposite the direction of deviation of said wire at a greater height above said wire than its opposite flange, and resilient means tending to move said member into pressing engagement of said wheel with said wire.

9. In a structure adapted to support a trolley above the roof of a car, the combination with a trolley wheel, a supporting member therefor movably mounted relative to the roof of said car and normally positioned to present said wheel to that portion of the wire extending in the median longitudinal perpendicular plane of the car with the median plane of the wheel in said first mentioned plane but adapted to be moved alternately in opposite directions from said normal position by opposite relative lateral deviations of said car and wire to present said wheel to said relatively deviating portions of said wire in positions of the merian plane of said wheel inclined against said wire in a direction opposite to the direction of said deviations, and resilient means tending to move said member to pressing engagement of said wheel with said wire in all positions of said wheel.

10. In a structure adapted to support a trolley above the roof of a car, the combination with a trolley wheel, a supporting member therefor movably mounted relative to the roof of said car and normally positioned to present said wheel to that portion of the wire extending in the median longitudinal perpendicular plane of the car with the median plane of the wheel in said first mentioned plane but adapted to be moved from said normal position by relative lateral deviations of said car and wire to present said wheel to said relatively deviating portions of said wire in positions of median plane of said wheel inclined in its upward direction toward the median perpendicular longitudinal plane of said car, and resilient means tending to move said member to pressing engagement of said wheel with said wire in all positions of said wheel.

11. In a structure adapted to support a trolley above the roof of a car, the combination with a trolley wheel adapted to engage an overhead wire, a member in which said wheel is journaled, resilient means tending to move said member into pressing engagement of said wheel with said wire, said member being movably mounted and normally occupying a position between the car roof and the overhead wire presenting said wheel to that portion of said wire extending in the median perpendicular longitudinal plane of the car with the axis of said wheel parallel to the plane of the roof of said car but adapted to be moved in opposite directions from said normal position by opposite relative deviations of said wire from said median plane to present said wheel to said deviating portions of said wire with the axis of said wheel inclined to the plane of the roof of said car in a direction opposite to the direction of lateral deviation of said wire.

12. In a structure adapted to support a trolley above the roof of a car, the combination with a trolley wheel adapted to engage an overhead wire, a member in which said wheel is journaled, resilient means tending to move said member into pressing engagement of said wheel with said wire, said member being movably mounted and normally occupying a position between the car roof and the overhead wire presenting said wheel to that portion of said wire extending in the median perpendicular longitudinal plane of the car with the axis of said wheel parallel to the plane of the roof of said car but adapted to be moved from said normal position by relative deviation of said wire from said median plane to present said wheel to said deviating portions of said wire with the axis of said wheel inclined to the plane of the roof of said car and in a direction toward the median longitudinal line thereof.

13. In a structure adapted to support a trolley above the roof of a car, the combination with a trolley wheel adapted to engage an overhead wire, a member in which said wheel is journaled upon an axis transverse to said member, a mounting for said member pivotally supporting the same relative to the roof of said car and adapting said member for separate or simultaneous oscillations in planes perpendicular to and obliquely inclined to the plane of the roof of said car, and whereby said oscillations in said obliquely inclined planes inclines the axis of said trolley wheel at varying degrees downwardly toward the median longitudinal line of said car roof and resilient means constantly tending to move said member into pressing engagement of said wheel with said wire.

14. In a structure adapted to support a trolley above the roof of a car, the combination with a trolley wheel adapted to engage an overhead wire, a pole therefor adapted to extend rearwardly of the car, a base rearwardly inclined relative to the roof of said car, a swivel upon said inclined base and a pivotal mounting for said pole upon said swivel.

15. In a structure adapted to support a trolley above the roof of a car, the combination with a trolley wheel adapted to engage an overhead wire, a pole therefor adapted to extend rearwardly of the car, a base rearwardly inclined relative to the roof of said car, a swivel upon said inclined base and a pivotal mounting for said pole upon said swivel and means for adjusting the degree of inclination of said base.

16. In a structure adapted to support a trolley above the roof of a car, the combination with a trolley wheel adapted to engage an overhead wire, a pole therefor, a member to which said pole is pivoted for oscillation toward and away from the roof of said car, said member being mounted for rotation upon an axis inclined to the roof of said car.

17. In a structure adapted to support a trolley above the roof of a car, the combination with a trolley wheel adapted to engage an overhead wire, a pole therefor, said pole being mounted for lateral oscillation in planes inclined to the plane of the roof of said car and for bodily rotation during said oscillations, whereby the axis of said wheel is inclined downwardly toward the roof of said car.

18. In a structure adapted to support a trolley upon the roof of a car, the combination with a trolley wheel adapted to engage an overhead wire, a pole therefor, a member to which said pole is pivoted upon an axis transverse to said pole, said member being mounted for rotation upon an axis inclined to the roof of said car, and means for adjusting the inclination of said last mentioned axis.

19. In a structure adapted to support a trolley above the roof of a car, the combination with a trolley wheel adapted to engage an overhead wire, a pole therefor, said pole being mounted for rotating about an axis parallel to the perpendicular longitudinal plane of the car but rearwardly inclined.

20. In a structure adapted to support a trolley above the roof of a car, the combination with a trolley wheel adapted to engage an overhead wire, a pole therefor, said pole being mounted for rotation about an axis parallel to the perpendicular longitudinal plane of the car but rearwardly inclined and means for adjustably varying the inclination of said axis.

21. In a structure adapted to support a trolley above the roof of a car, the combination with a trolley wheel adapted to engage an overhead wire, a member in which said wheel is journaled, said member being mounted for lateral movement of its wheel bearing portion in opposite directions transversely of the roof of said car by corresponding lateral deviations of the wire relative to the path of the car to present said wheel to the relatively deviating portions of said wire bodily inclined against that side of said wire within the angle or curve described by the lateral deviation, and resilient means tending to move said wheel toward said wire in the direction of its inclination.

In testimony that I claim the foregoing, I have hereunto set my hand this 27 day of August, 1921.

CHARLES B. BRANSON.